(12) United States Patent
Arduini

(10) Patent No.: US 8,008,960 B2
(45) Date of Patent: Aug. 30, 2011

(54) SYNCHRONOUS RECTIFIER POST REGULATOR

(75) Inventor: Douglas Paul Arduini, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 564 days.

(21) Appl. No.: 12/107,607

(22) Filed: Apr. 22, 2008

(65) Prior Publication Data

US 2009/0261790 A1    Oct. 22, 2009

(51) Int. Cl.
*H03H 11/26* (2006.01)
(52) U.S. Cl. .......... 327/280; 327/393; 323/266
(58) Field of Classification Search .......... 363/16–20, 363/21.01, 21.06, 21.14, 21.18, 25, 26, 127, 363/131, 134, 89; 323/265–266, 271, 272, 323/322, 224, 222; 327/280, 113, 393
See application file for complete search history.

(56) References Cited

U.S. PATENT DOCUMENTS

| | | | |
|---|---|---|---|
| 5,955,910 A * | 9/1999 | Levin et al. .......... 327/393 |
| 6,104,623 A | 8/2000 | Rozman | |
| 6,330,169 B2 * | 12/2001 | Mullett et al. .......... 363/16 |
| 7,026,797 B2 * | 4/2006 | McCune, Jr. .......... 323/225 |
| 2005/0057951 A1 | 3/2005 | Berghegger | |
| 2005/0180178 A1 | 8/2005 | Yang | |
| 2006/0274559 A1 | 12/2006 | Saeueng et al. | |

* cited by examiner

Primary Examiner — Rajnikant B Patel
(74) Attorney, Agent, or Firm — Patterson & Sheridan, LLP

(57) ABSTRACT

Methods and apparatus for regulating a synchronous rectifier DC-to-DC converter by adjusting one or more existing synchronous rectifiers in the converter are provided. By regulating an existing synchronous rectifier, the rectifier may function as a modulator for post regulation over a limited range of output voltages suitable for load regulation, without introducing an additional conversion stage for post regulation, which typically decreases efficiency and power density. Independent post regulation of an existing synchronous rectifier may improve the load regulation, reduce output voltage ripple, and improve the transient response of the converter. By operating independently from the main control loop, post regulation may most likely avoid the limitations of the main control loop, such as limited gain bandwidth and a relatively slow transient response. Such post regulation may be added to isolated or non-isolated switched-mode power supplies, such as forward or buck converters.

20 Claims, 9 Drawing Sheets

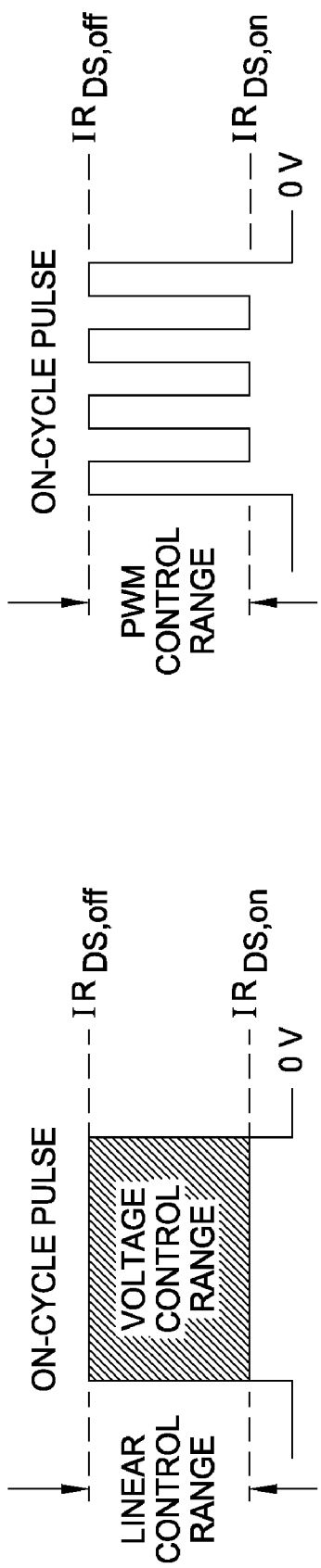
FIG. 2
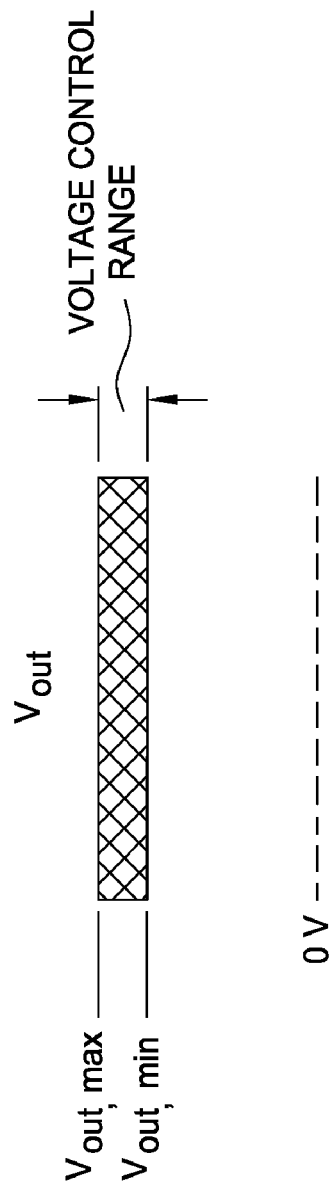
FIG. 7
FIG. 3

SYNCHRONOUS RECTIFIER POST REGULATOR

BACKGROUND OF THE INVENTION

1. Field of the Invention

Embodiments of the present invention generally relate to post regulation of synchronous rectifier DC-to-DC converters and, more particularly, to post regulation of existing synchronous rectifiers in such DC-to-DC converters, independent of the main control loop.

2. Description of the Related Art

In modern power supply design, DC-to-DC converters are designed to have a very high gain-bandwidth product to provide high output current slew rate and minimize the capacitance for acceptable output voltage quality. The typical isolated power supply has one control regulator that operates the primary-side switching modulator to control line and load regulation, with either single or multiple control loops on the primary and/or secondary side of the transformer. However, isolated power supplies have a practical frequency limit that is from 2 to 10 times lower than the switching frequency to maintain operational stability, thereby limiting the maximum gain bandwidth desired for the fastest load voltage transient response. The maximum switching frequency is limited by the transformer magnetic materials and designs because of core losses and leakage inductances that effect reactive and switching losses. These losses should be kept low to provide high operating efficiencies and lower heat dissipation. Therefore, the switching frequencies and the gain-bandwidth are limited and cannot be as high as desired to provide a desirably fast load transient response.

In switch-mode power supplies and other types of DC-to-DC converters, secondary post regulators that are independent of the primary-side regulator are often placed in the secondary side of the transformer for faster load voltage transient response and better load regulation. These are usually linear regulators or pulse width modulated (PWM) buck regulators of various sorts, including magnetic amplifiers (mag amps). However, all these solutions add an additional conversion stage to the power supply that adds significant losses and requires the cost, size, and complexity of another series regulator device, such as a power metal oxide semiconductor field effect transistor (MOSFET).

Overview

Embodiments of the present invention generally relate to post regulation of a DC-to-DC converter using one or more synchronous rectifiers already existing in the converter topology.

One embodiment of the present invention provides an apparatus. The apparatus generally includes a transformer having a primary winding and a secondary winding; a first switching device coupled to the primary winding for generating changes in voltage across the primary winding such that the primary winding transfers energy to the secondary winding; an output filter having an inductor and a capacitor in series; a first rectifier coupled between a first end of the secondary winding and the output filter, wherein the first rectifier is a synchronous rectifier; a second rectifier in parallel with the output filter and coupled between a second end of the secondary winding and the first rectifier; and post regulation logic configured to adjust a parameter of the synchronous rectifier based on an output of the apparatus in an effort to match a target output.

Another embodiment of the present invention provides an apparatus. The apparatus generally includes a transformer having a primary winding and a secondary winding; a means for switching coupled to the primary winding for generating changes in voltage across the primary winding such that the primary winding transfers energy to the secondary winding; a means for filtering an output of the apparatus; a first means for rectifying coupled between a first end of the secondary winding and the means for filtering, wherein the first means for rectifying is a synchronous rectifier; a second means for rectifying disposed in parallel with the means for filtering and coupled between a second end of the secondary winding and the first means for rectifying; and means for adjusting a parameter of the synchronous rectifier such that an output of the apparatus is post regulated to meet a target output.

Yet another embodiment of the present invention provides a method. The method generally includes in a first state, closing a switching device coupled to a primary winding of a transformer such that current flows through a first rectifier coupled between an output filter and a first end of a secondary winding of the transformer, through an output inductor of the output filter, and through a load in parallel with an output capacitor of the output filter, wherein the first rectifier is a synchronous rectifier and the output inductor and the output capacitor are in series; in a second state, opening the switching device such that current flows through the output inductor, the load, and a second rectifier in parallel with the output filter and coupled between the first rectifier and a second end of the secondary winding; alternating between the first state and the second state; and adjusting a parameter of the synchronous rectifier such that an output associated with the load is post regulated to meet a target output.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 illustrates an example linear voltage control range across the series synchronous rectifier of FIG. 1, in accordance with an embodiment of the present invention.

FIG. 3 illustrates an example voltage control adjustment range of the output voltage from modulating the series synchronous rectifier of FIG. 1, in accordance with an embodiment of the present invention.

FIG. 7 illustrates an example PWM voltage control range across the series synchronous rectifier of FIG. 6, in accordance with an embodiment of the present invention.

DESCRIPTION OF EXAMPLE EMBODIMENTS

Embodiments of the present invention provide techniques for regulating a synchronous rectifier DC-to-DC converter by adjusting one or more existing synchronous rectifiers in the converter. By regulating an existing synchronous rectifier, the rectifier may function as a modulator for post regulation over a limited range of output voltages suitable for load regulation, without introducing an additional conversion stage for post regulation, which typically decreases efficiency and power density. Independent post regulation of an existing synchronous rectifier may improve the load regulation, reduce output voltage ripple, and improve the transient response of the converter. By operating independently from the main control loop, post regulation may most likely avoid the limitations of the main control loop, such as limited gain bandwidth and a relatively slow transient response. Such post regulation may be added to isolated or non-isolated switched-mode power supplies, such as forward or buck converters.

Post Regulation Using a Linear Method

Figure 1:
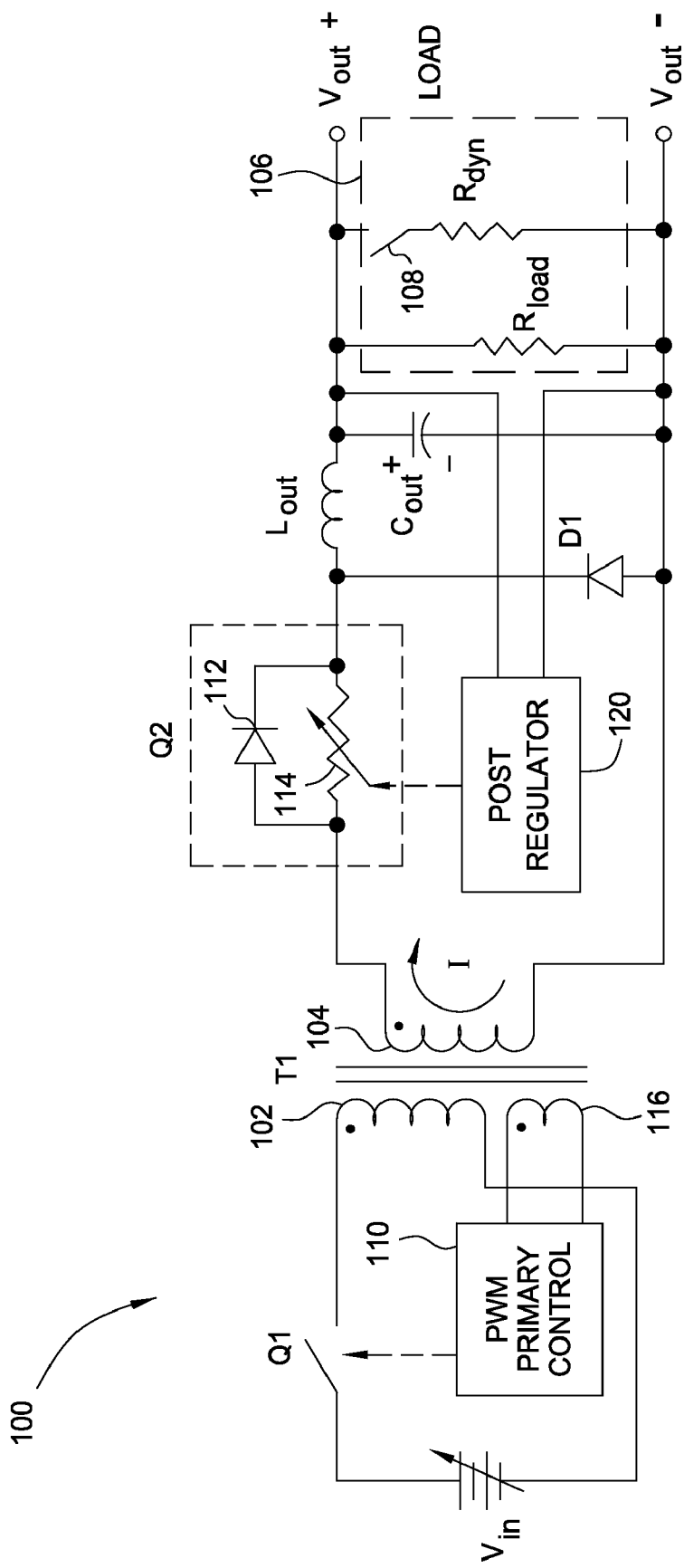
FIGS. 1 and 1A illustrate post regulation of a series synchronous rectifier in a forward converter by using a linear method, wherein the on-resistance of the synchronous rectifier is adjusted, in accordance with embodiments of the present invention.

FIG. 1 illustrates post regulation of a series synchronous rectifier in a forward converter by using a linear method, wherein the on-resistance of the synchronous rectifier is adjusted. In the schematic 100 of FIG. 1, typical elements of a forward converter topology are illustrated, such as a transformer T1 having a primary winding 102 and a secondary winding 104, a primary-side switch Q1 to provide an alternating current through the transformer T1, a series rectifier Q2, a flyback rectifier (e.g., freewheeling diode D1), an output inductor $L_{out}$, and output bulk capacitance $C_{out}$. The output voltage ($V_{out}$) of the forward converter may be supplied to a load 106, which may be a dynamic load as modeled by the parallel combination of a static load resistance $R_{load}$ and a dynamic load resistance $R_{dyn}$ in series with a load switch 108. The operation of the primary-side switch Q1 may be controlled by a pulse width modulated (PWM) primary-side control logic 110 such that the desired duty cycle between closing and opening the switch—and thereby connecting and disconnecting the source of input voltage ($V_{in}$) to the primary winding 102 of the transformer T1—may be achieved.

Although not shown in the schematic 100, $V_{in}$ may be filtered by any suitable filter circuits known to those skilled in the art, such as a pi filter or an inductor-capacitor (LC) filter, in an effort to remove high frequency components and provide clean input voltage to the forward converter. Input bulk capacitance ($C_{in}$) may be electrically coupled in parallel with $V_{in}$ and may comprise one or more capacitors, which may be any suitable type including aluminum electrolytic, tantalum, and/or ceramic capacitors, for example.

The primary and secondary windings 102, 104 may be wound around a core in the turns ratio 1:N, where N is the ratio of secondary winding turns to primary winding turns. The core may have any suitable shape (e.g., a toroidal core, a pot core, or an E-I core) and may be composed of any suitable material, such as powdered iron or another ferrous material. For some embodiments, the transformer T1 may be shielded and/or potted. The primary winding 102 may have the same winding configuration as the tapped secondary winding 104 such that the secondary current will be in phase with the primary current. This is illustrated by the dot convention in FIG. 1.

The order of the primary winding 102 and the primary-side switch Q1 may be reversed for some embodiments without affecting the general operation of the forward converter. The primary-side switch Q1 may comprise any suitable switching device capable of operating at the desired switching frequency (typically in the range of about 40 kHz to 250 kHz or higher), such as a metal oxide semiconductor field effect transistor (MOSFET), a bipolar junction transistor (BJT), or a solid state relay (SSR). The control logic 110 for closing/opening the primary-side switch Q1 may be part of a processor or a separate integrated circuit (IC).

On the secondary side, the output inductor $L_{out}$ and output bulk capacitance $C_{out}$ may form an output filter for low pass filtering the rectified waveform on the secondary winding 104 into a DC output voltage ($V_{out}$). The winding of the output inductor $L_{out}$ may be wound around a core of any suitable material, such as air, ceramic, plastic, or magnetic materials (e.g., ferrite). The core may be a rod, a toroid, or a pot core. The output bulk capacitance $C_{out}$ may represent one or more capacitors and may comprise any suitable capacitor(s) with low equivalent series resistance (ESR) for reducing the output ripple voltage, such as aluminum electrolytic, tantalum, and/or ceramic capacitors.

The series rectifier Q2 may be a synchronous rectifier and may comprise a MOSFET, such as an n-channel MOSFET. However, to illustrate the concept of linear post regulation according to embodiments of the invention, the series rectifier Q2 may be modeled as a diode 112 in parallel with a variable resistance 114. The diode 112 may represent the body diode of such a MOSFET, and the variable resistance 114 may represent the drain-to-source resistance ($R_{DS}$) of the same MOSFET operating in the linear region.

As for the freewheeling diode D1, it may comprise any suitable p-n junction, such as a silicon diode, a Schottky diode, or the body diode of a MOSFET. For some embodiments, the freewheeling diode D1 may be replaced with a synchronous rectifier.

Figure 1A:
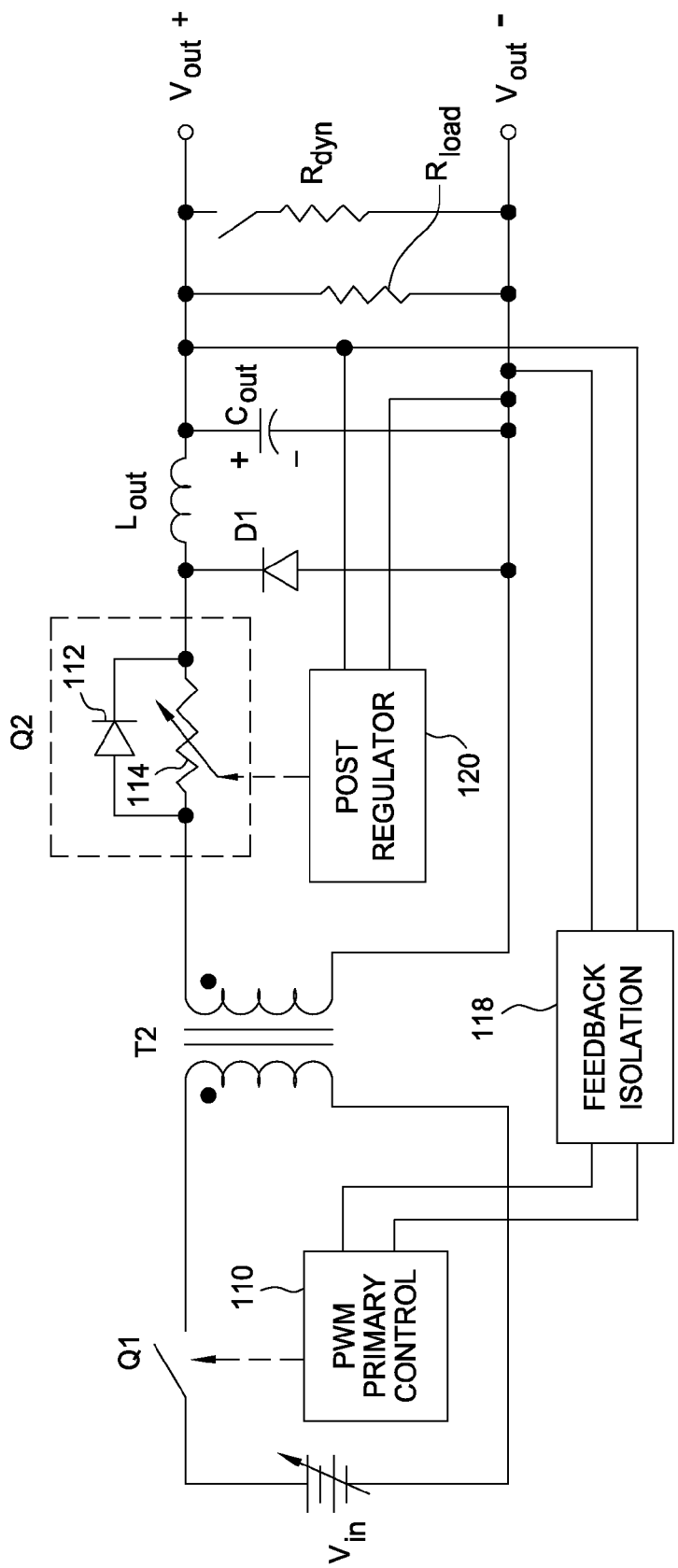

For some embodiments, a parameter on the secondary side of the forward converter may be sensed and fed back to the control logic 110 for closed loop operation of the main control loop for the switched-mode power supply (SMPS). This sensed parameter may include, for example, the output voltage ($V_{out}$), the output current, or the output power. With this feedback, the control logic 110 may adjust the duty cycle of the primary-side switch Q1 in an effort to achieve the desired output voltage ($V_{out}$) on the secondary side. As isolated feedback for the main control loop, the transformer T1 may have a voltage sensing feedback winding 116 as illustrated in FIG. 1 for some embodiments. For other embodiments, as illustrated in FIG. 1A, the sensed parameter may be fed back across an isolation barrier through a feedback isolation circuit 118, such as an optocoupler or a second transformer. With the use of an optocoupler, the transformer T2 need not include a feedback winding. Furthermore, some embodiments may sense the input voltage ($V_{in}$) for line regulation of the forward converter.

On the secondary side, a post regulator circuit 120 may sense the output voltage ($V_{out}$) across the load 106, the output current, or the output power in an effort to linearly control the on-resistance of the series synchronous rectifier Q2 (modeled as the variable resistance 114 in FIG. 1) during it's on-cycle as a series pass transistor. By controlling the gate voltage ($V_G$) of the synchronous rectifier Q2, this linear method of post regulation may adjust the drain-to-source resistance ($R_{DS}$) from saturation ($R_{DS,on}$ with the lowest resistance corresponding to a high gate voltage) to the off state ($R_{DS,off}$ with the highest resistance corresponding to a low gate voltage). As illustrated in FIG. 2, the voltage drop across the series rectifier Q2 may range from $IR_{DS,off}$ (or the forward voltage drop across the body diode native to power MOSFETs, whichever is lower) to $IR_{DS,on}$, where I is the current through the series rectifier Q2 during its on-cycle.

With the linear control range of FIG. 2 during an on-cycle pulse, the series rectifier Q2 may be operated to have a voltage drop anywhere between and including the saturated and the off states in an effort to quickly post regulate the forward converter. When the post regulator circuit 120 determines that the output voltage ($V_{out}$) (or the output current or power) is low compared to a target range, the post regulator circuit 120 may respond by increasing the gate voltage of the series rectifier Q2 to lower the drain-to-source resistance ($R_{DS}$) and, hence, the voltage drop across the rectifier Q2. By decreasing the voltage drop across the series rectifier Q2, there will be less voltage lost from the voltage across the secondary winding 104 during the on-cycle of the series rectifier Q2, and the output voltage ($V_{out}$) should increase.

In contrast, when the post regulator circuit 120 determines that the output voltage ($V_{out}$) (or the output current or power) is high compared to a target range, the post regulator circuit 120 may respond by decreasing the gate voltage of the series rectifier Q2 to raise the drain-to-source resistance ($R_{DS}$) and, hence, the voltage drop across the rectifier Q2. By increasing the voltage drop across the series rectifier Q2, there will be more voltage lost from the voltage across the secondary winding 104 during the on-cycle of the series rectifier Q2, and the output voltage ($V_{out}$) should decrease.

Therefore, the on-resistance of the series synchronous rectifier Q2 may be linearly regulated as a series impedance within the linear control range of FIG. 2 in an effort to regulate the output voltage ($V_{out}$) over the load current range for load regulation. FIG. 3 illustrates an example voltage control range of the output voltage ($V_{out}$) from adjusting the series synchronous rectifier Q2 with the post regulator circuit 120 of FIG. 1 as described above. The output voltage ($V_{out}$) may range from $V_{out,max}$ (corresponding to $IR_{DS,on}$) to $V_{out,min}$ (corresponding to the body diode drop).

Not only does this linear post regulation method utilize the series synchronous rectifier Q2 that already exists in any forward converter topology, but this method is very fast when compared to conventional post regulation techniques, operating with a small-signal gain bandwidth over a small change in gate voltage ($V_G$). Furthermore, the post regulator circuit 120 may operate independently from the primary-side control logic 110, which provides much slower control of the line regulation and some minimal load regulation. Therefore, the primary-side control switching can be much simpler and may only provide line regulation without load regulation for some embodiments. This independence may provide voltage gain bandwidths and current slew rates unrestricted to the primary-side switching frequency limitations involving the transformer T1. This fast post regulation method may also be independent of slower primary-side regulation that may include feedback from the secondary-side to the control logic 110 using an optocoupler or feedback winding on the transformer. Moreover, such post regulation of the output voltage ($V_{out}$) may reduce the ripple voltage when compared to converters without post regulators. This fast post regulation method may also provide fast transient voltage control of the output. Such techniques may also be applied to non-isolated DC-to-DC converters, such as a buck converter, with the same advantages in the load regulation, transient response, and slew rate of the power supply.

Figure 4:
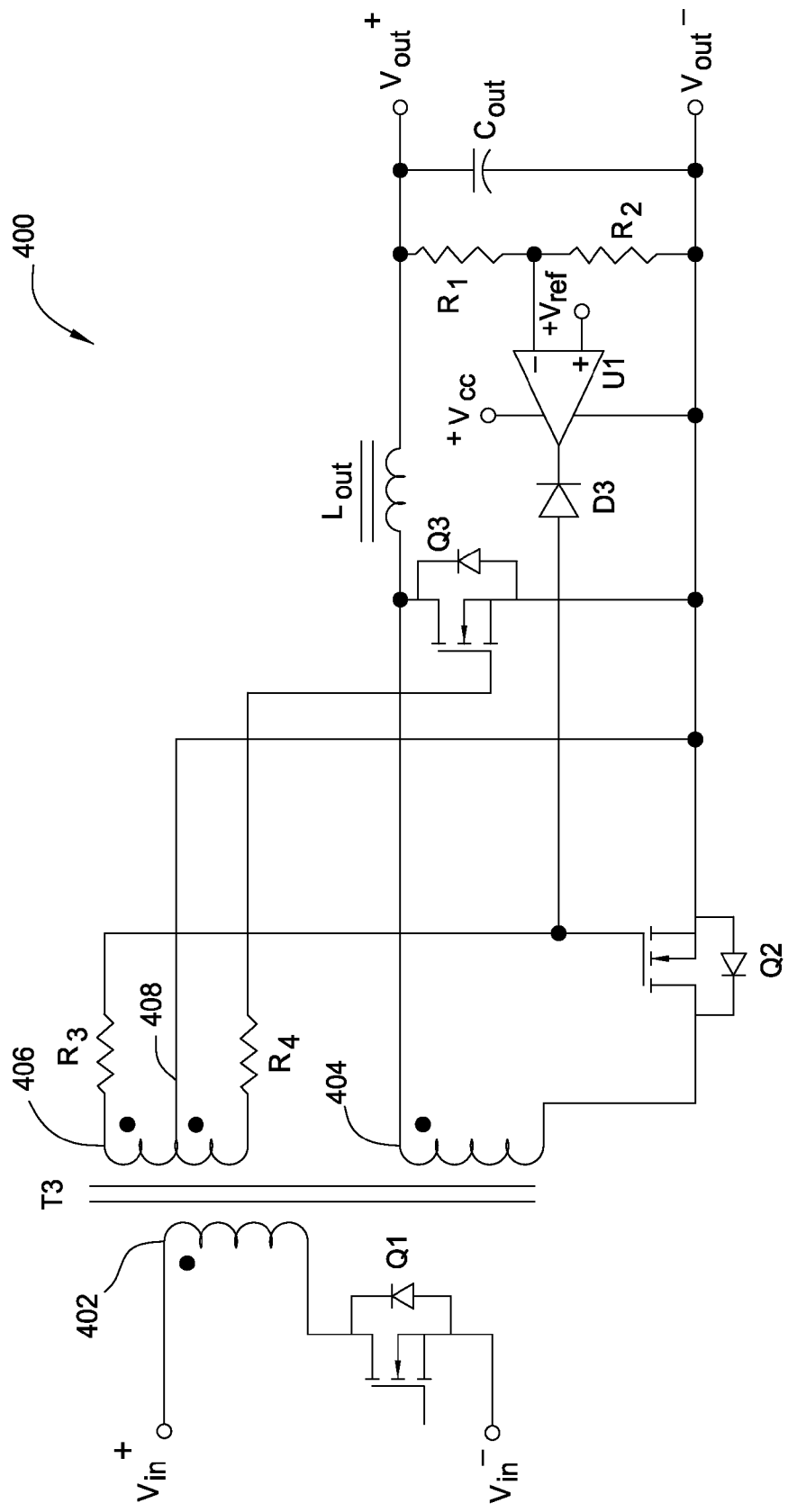
FIG. 4 illustrates a schematic for self-driven post regulation of a series synchronous rectifier in a forward converter by using a linear method similar to the topology in FIG. 1, in accordance with an embodiment of the present invention.

There are many ways to implement the forward converter with the linear post regulation method described above. FIG. 4 illustrates a schematic 400 for self-driven post regulation of the series synchronous rectifier Q2 in a forward converter by using a linear method similar to the topology in FIG. 1. In the schematic 400, an n-channel MOSFET (or NMOS) functions as the primary-side switch Q1, and the gate of this NMOS may be connected to the control logic 110 for pulse-width modulation of the switch Q1. The transformer T3 may have a primary winding 402, a first secondary winding 404, and a second secondary winding 406 having a tap 408. The typical elements of a forward converter topology (e.g., the series rectifier Q2, the flyback rectifier Q3, the output inductor $L_{out}$, and the output bulk capacitance $C_{out}$) may be coupled to the first secondary winding 404. A first end of the second secondary winding 406 may be coupled to the gate of the series synchronous rectifier Q2 through a resistor $R_3$, and the tap 408 may be coupled to the common reference point for the output voltage ($V_{out}$). In FIG. 4, the flyback rectifier Q3 is an n-channel MOSFET with its gate coupled to a second end of the second secondary winding 406 through a resistor $R_4$ for synchronous rectification.

For some embodiments, there may be a diode (not shown), such as a zener diode, coupled across the gate and the source of the series synchronous rectifier Q2 and/or the flyback rectifier Q3. Such diodes may be used to clamp the maximum voltage to the gate in the positive polarity phase and clamp the voltage from the gate to the source ($V_{GS}$) to a negative diode drop in the negative phase. Some embodiments may include a series diode (not shown) coupled between the resistor $R_3$ and the gate of the series synchronous rectifier Q2. Furthermore, some embodiments may include a resistor (not shown) coupled between the gate and the source of the series synchronous rectifier Q2. This resistor may serve to discharge the gate voltage at the end of the positive gate drive phase if the series diode from the transformer T3 is used. The second secondary winding 406 of the transformer T3 may not be center-tapped for some embodiments. Also for some embodiments, there may be a diode in parallel with the resistor $R_3$ and another diode in parallel with resistor $R_4$.

For the post regulation according to the linear control method described above, a voltage divider may be formed by resistors $R_1$ and $R_2$ to create a divided-down version of the output voltage ($V_{out}$) across $R_2$ and provide it to the negative terminal of an operational amplifier (op amp) U1. A voltage reference ($V_{ref}$) may be provided to the positive terminal of op amp U1. $V_{ref}$ may be provided by any suitable means for creating a stable reference voltage, such as a zener diode, a voltage reference integrated circuit (IC), or a shunt regulator. For some embodiments, power may be supplied to op amp U1 through a second forward converter circuit (not shown) comprising rectifiers, a supply inductor, and a supply capacitor in an effort to create a separate DC power rail ($V_{CC}$). $V_{CC}$ may also be used to power the generation of $V_{ref}$. Those skilled in the art may recognize that other types of circuits may be used to create $V_{CC}$ or $V_{ref}$.

During operation, op amp U1 may adjust the gate voltage of the series synchronous rectifier Q2 in an attempt to keep the divided-down version of the output voltage at its negative terminal equal to the voltage reference ($V_{ref}$) at its positive terminal. The op amp U1 may be selected to have a desired slew rate and a low offset voltage. In FIG. 4, the diode D3 coupled between the gate of the series synchronous rectifier Q2 and the output of op amp U1 may allow the gate voltage to be clamped at the regulation level for linear control and may allow the op amp U1 to function as a current sink during the positive gate drive phase. However, the diode D3 may allow the voltage on the gate of the series synchronous rectifier Q2 to go low (i.e., the MOSFET is off) during the negative phase.

Figure 5:
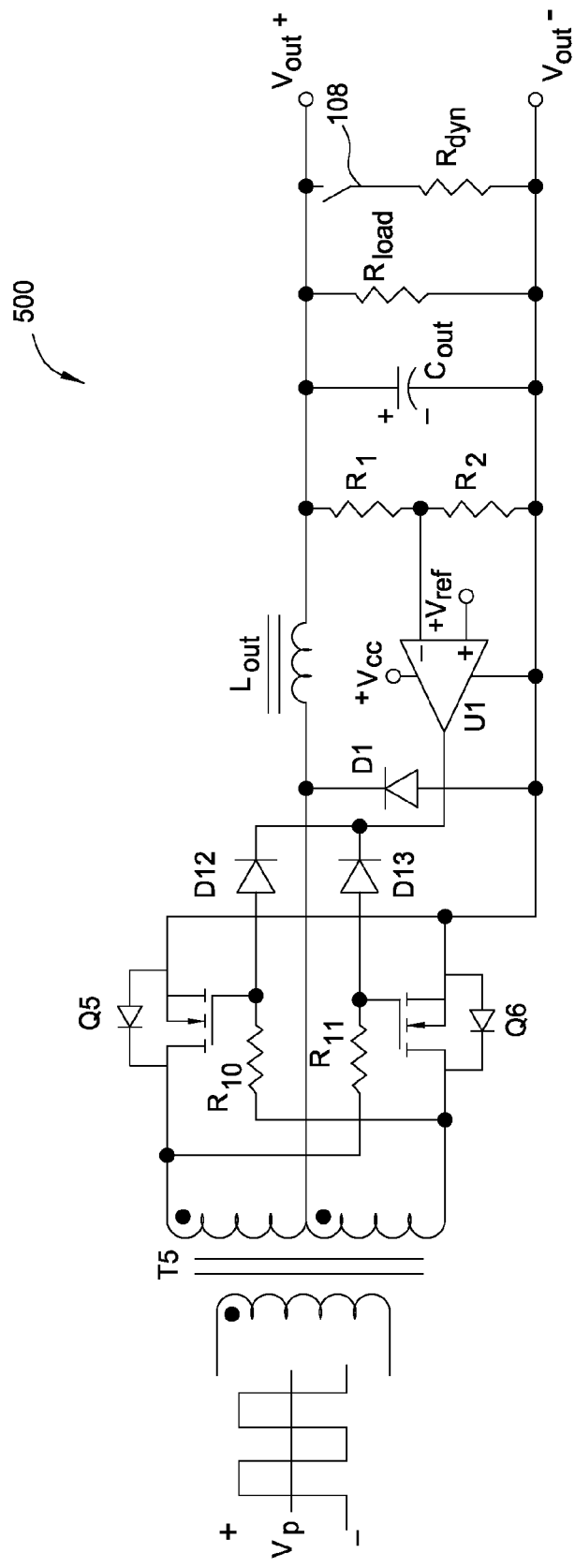
FIG. 5 illustrates a full-wave synchronous rectifier with self-driven post regulation of the series rectifiers using a linear method, wherein the on-resistances of the series synchronous rectifiers are adjusted, in accordance with an embodiment of the present invention.

FIG. 5 illustrates a schematic 500 of a full-wave synchronous rectifier with self-driven post regulation of the series rectifiers Q5, Q6 using a linear method, wherein the on-resistances of the series synchronous rectifiers are adjusted as described above. For regular operation of the full-wave synchronous rectifier, either the gate of synchronous rectifier Q5 or the gate of synchronous rectifier Q6 will be high enough to turn on the rectifier and sink current through the load 106 and the output inductor $L_{out}$ back to electrical ground. Freewheeling diode D1 may sink the current during transitions between the synchronous rectifiers Q5, Q6, but is normally reverse-biased.

Op amp U1 may automatically adjust the gate voltage of whichever synchronous rectifier is in its on-state as part of a post regulator circuit 120 for linear control of the on-resistance. For example, if rectifier Q6 is in its on-state with a high gate voltage (meaning that rectifier Q5 is in its off-state with a low gate voltage), then op amp U1 may modulate the gate voltage at rectifier Q6 through diode D13. Since the gate voltage at rectifier Q5 is very low, diode D12 will be reverse-biased such that the output voltage of op amp U1 cannot affect the gate voltage at rectifier Q5. Likewise, when rectifier Q5 is in its on-state, diode D13 will be reverse-biased such that the output voltage of op amp U1 cannot affect the gate voltage at rectifier Q6, but can modulate the gate voltage at rectifier Q5 through diode D12.

Since FIG. 5 is a simplified circuit diagram, some details of the schematic 500 have been left out in order to illustrate the concept of post regulation using existing synchronous rectifiers. For example, as shown in FIG. 5, there is currently no return path for the gate drive during a MOSFET off-time cycle without a separate gate transformer winding, such as the second secondary winding 406 of FIG. 4. For some embodiments, the synchronous rectifiers may have gate resistors (not shown) in an effort to discharge the gate voltage due to any cross conduction during transitions of secondary winding voltage.

Post Regulation Using PWM

Figure 6:
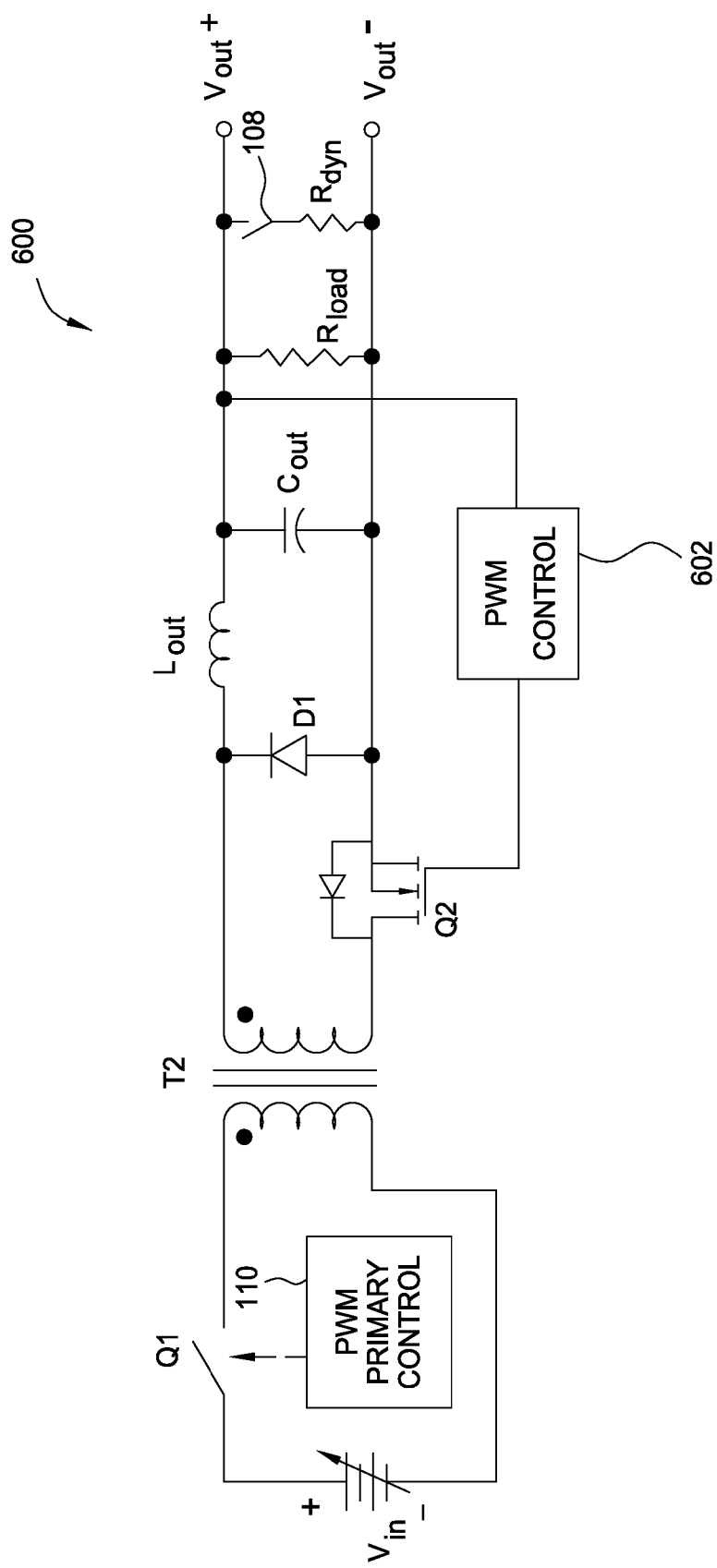
FIG. 6 illustrates post regulation of a series synchronous rectifier in a forward converter by using a pulse width modulation (PWM) method, wherein the effective average voltage drop of the on-resistance of the series synchronous rectifier is adjusted, in accordance with an embodiment of the present invention.

In addition to the linear control method for post regulation of an existing synchronous rectifier, FIG. 6 illustrates a schematic 600 for post regulation of the series synchronous rectifier Q2 in a forward converter by using a pulse width modulation (PWM) method, wherein the effective average of the on-resistance of the series synchronous rectifier is adjusted. Rather than the post regulator circuit 120 of FIG. 1, the PWM post regulation method may use a secondary-side PWM control circuit 602. This may allow the post regulator independence from the primary-side control logic 110 and allow increased gain bandwidth and faster transient response than the primary-side switching regulator can provide.

In contrast with adjusting the actual on-resistance of the series synchronous rectifier Q2 in a linear fashion, the PWM control circuit 602 may pulse the gate voltage of the series synchronous rectifier Q2 in an effort to create an effective on-resistance ranging from saturation ($R_{DS,on}$ with the lowest resistance corresponding to a high gate voltage) to the off state ($R_{DS,off}$ with the highest resistance corresponding to a low gate voltage). For some embodiments, the pulses for PWM post regulation may range between any two drain-to-source resistance ($R_{DS}$) levels; the two levels need not be saturation (fully on) and fully off. As illustrated in FIG. 7, the voltage drop pulses across the series rectifier Q2 may range from $IR_{DS,off}$ (or the forward voltage drop across the body diode native to power MOSFETs, whichever is lower) to $IR_{DS,on}$, where I is the current through the series rectifier Q2 during its on-cycle. The PWM control circuit 602 may adjust the duty cycle of the pulses in an effort to adjust the effective on-resistance and potentially lower the power dissipation of the series rectifier Q2. By adjusting the effective on-resistance, the output voltage ($V_{out}$) may be controlled quickly for improved load regulation and transient response as illustrated in FIG. 3 and described above.

Figure 8:
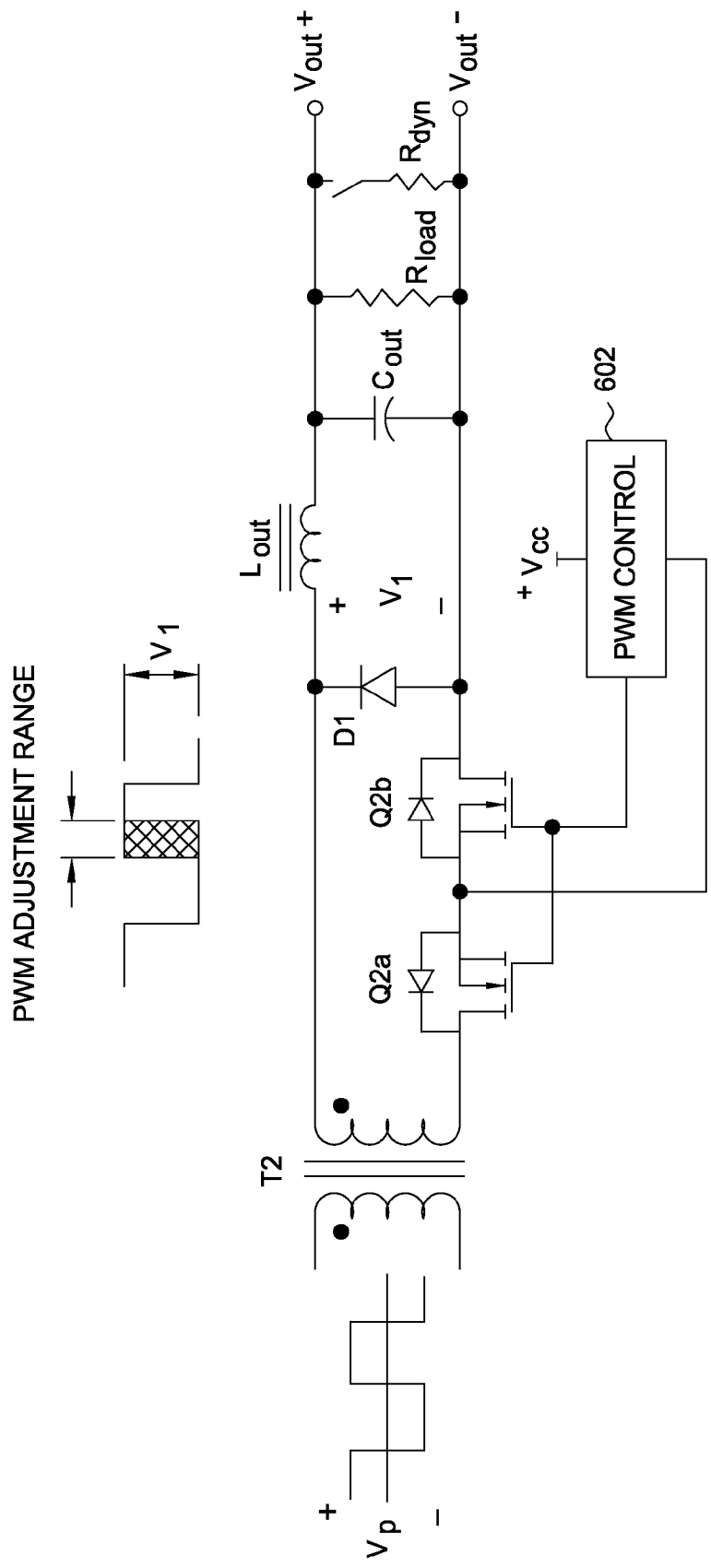
FIG. 8 illustrates PWM post regulation of a synchronous rectifier comprising back-to-back FETs (field effect transistors) in accordance with an embodiment of the present invention.

Referring now to FIG. 8, PWM post regulation may be applied to a unidirectional field effect transistor (FET) without a body diode or to back-to-back FETs Q2a, Q2b with body diodes to allow full PWM post regulation in the secondary from a chopper, for example. The FET Q2b may be added in series with the existing series synchronous rectifier Q2 of FIG. 6, for example. The sources of the back-to-back FETs Q2a, Q2b may be coupled to a common reference point of the PWM control circuit 602, which may be powered from another power supply rail $V_{cc}$, such as one generated by a second forward converter (not shown). The pulse width modulation adjustment range of voltage V1 across diode D1 as the gate voltages across the back-to-back FETs Q2a, Q2b are modulated is illustrated, as well. Although FIG. 8 illustrates an exemplary half-wave rectifier, the schematic may be considered as depicting half of a full-wave synchronous rectifier (not shown) and may be modified accordingly.

Post Regulation of a Flyback Synchronous Rectifier

Although the series synchronous rectifier Q2 is modulated for post regulation in the examples described above, the flyback rectifier Q3 may be a synchronous rectifier and may be modulated for some amount of post regulation of the output voltage ($V_{out}$), as well. This post regulation may be accomplished using the linear control method, the PWM method, or other suitable methods, such as those described below.

Figure 9A:
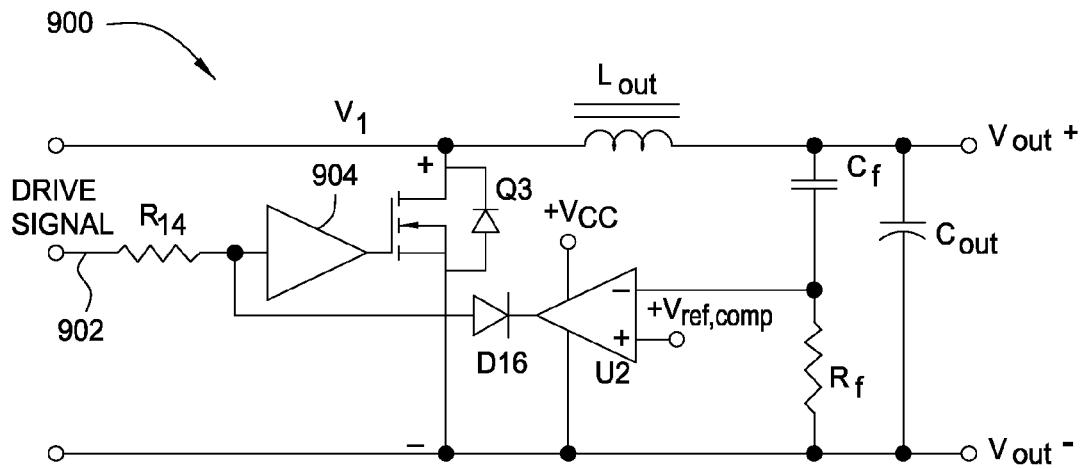
FIG. 9A illustrates a circuit diagram for post regulation of a flyback synchronous rectifier in a forward converter operating in continuous mode, in accordance with an embodiment of the present invention.

For example, FIG. 9A illustrates a circuit diagram 900 for post regulation of the flyback rectifier Q3 in a forward converter operating in continuous mode. Such post regulation may allow for fast positive transient control of the existing flyback rectifier Q3 in a typical forward converter topology. In the circuit diagram 900, the output voltage may be filtered through a high pass filter comprising capacitor $C_f$ and resistor $R_f$ and serving as a differentiator. The output of the high pass filter may be coupled to the negative terminal of a comparator U2, and a reference voltage ($V_{ref,comp}$) may be supplied to the positive terminal of the comparator U2. Those skilled in the art may recognize other types of circuits may be used to create $V_{ref,comp}$, to supply a sample of $V_{out}$ to the negative terminal of comparator U2, and to modulate the gate drive voltage.

A Q3 gate drive signal 902 for synchronous rectification may be coupled to the gate of the flyback rectifier Q3 through a resistor $R_{14}$ and a driver 904. The drive signal 902 may be generated, for example, by a secondary winding of a transformer in the forward converter. The comparator U2 may modulate the drive signal 902 via a diode D16 coupled between the input to the driver 904 and the output of the comparator U2.

With the circuit configuration of FIG. 9A, the flyback rectifier Q3 is normally on when the drive signal 902 is logic high (H), or at least high enough to trigger the minimum input voltage for the driver 904. When a positive transient voltage appears at the output voltage ($V_{out}$), the negative terminal of U2 may temporarily be higher than the reference voltage ($V_{ref,comp}$), and the comparator U2 may output a logic low (L) to pull the input to the driver 904 low, such that the flyback rectifier Q3 is temporarily turned off. However, the body diode of the flyback rectifier Q3 may still function to allow current to flow through the flyback rectifier Q3 and the output inductor ($L_{out}$). Current from the drive signal may be returned through the resistor $R_{14}$, the diode D16, and the output circuitry of the comparator U2 to the common reference (i.e., electrical ground) of the secondary.

Figure 9B:
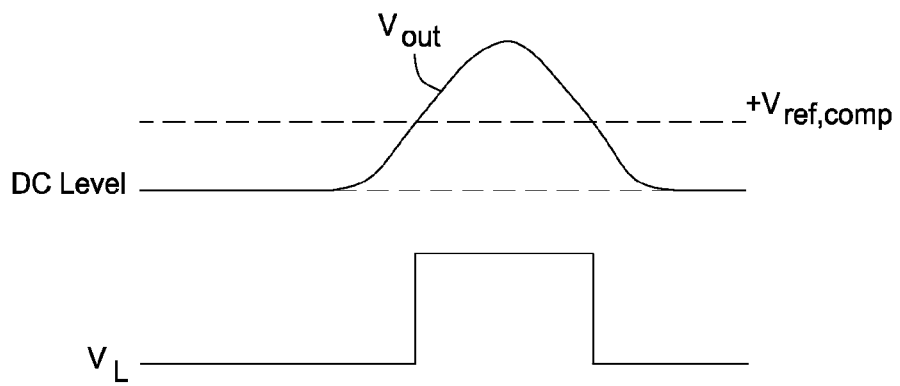
FIG. 9B illustrates example waveforms for the circuit diagram of FIG. 9A, in accordance with an embodiment of the present invention.
Figure 9B:
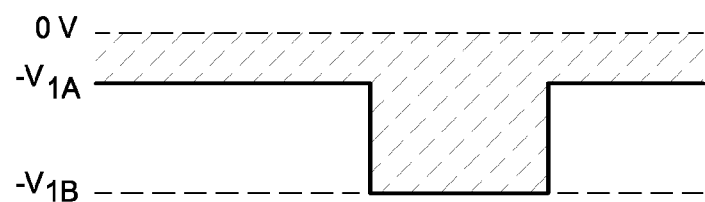

By turning off the flyback rectifier Q3 during a high voltage transient, the drain-source voltage ($V_{DS}$) across the flyback rectifier Q3 may become more negative. This is illustrated in FIG. 9B, where a positive voltage transient above the normal DC level for the output voltage ($V_{out}$) occurs. Once the voltage of the transient waveform increases such that the voltage across $R_f$ rises above the reference voltage ($V_{ref,comp}$), the comparator U2 may output a logic low (L), pulling the input to the driver 904 down, at least until the voltage of the transient returns below $V_{ref,comp}$. The drain-source voltage ($V_{DS}$) across the flyback rectifier Q3 (labeled as $V_1$ in FIG. 9A) may become more negative while the voltage of the transient is above $V_{ref,comp}$, decreasing from the current (I) multiplied with the on-resistance ($R_{DS,on}$) (i.e., $-V_{1A}$) to the negative of the body diode voltage drop for the current (I) (i.e., $-V_{1B}$).

$V_{DS}$ across the flyback rectifier Q3 temporarily becomes more negative to increase the voltage ($V_L$) across the output inductor ($L_{out}$), or choke, as shown in FIG. 9B, thereby allowing for more sink current. This result is an advantage when a high voltage transient occurs, especially with low output voltages (e.g., 0.8 V DC). The typical voltage across the flyback rectifier Q3 may be about −0.1 V when the component is on, but may decrease to −0.8 V when the flyback rectifier Q3 is off. Therefore, the current sinking of a 500 nH choke may be increased from about 1.8 A in 1 μs to 3.2 A, where di=Vdt/L.

Figure 10:
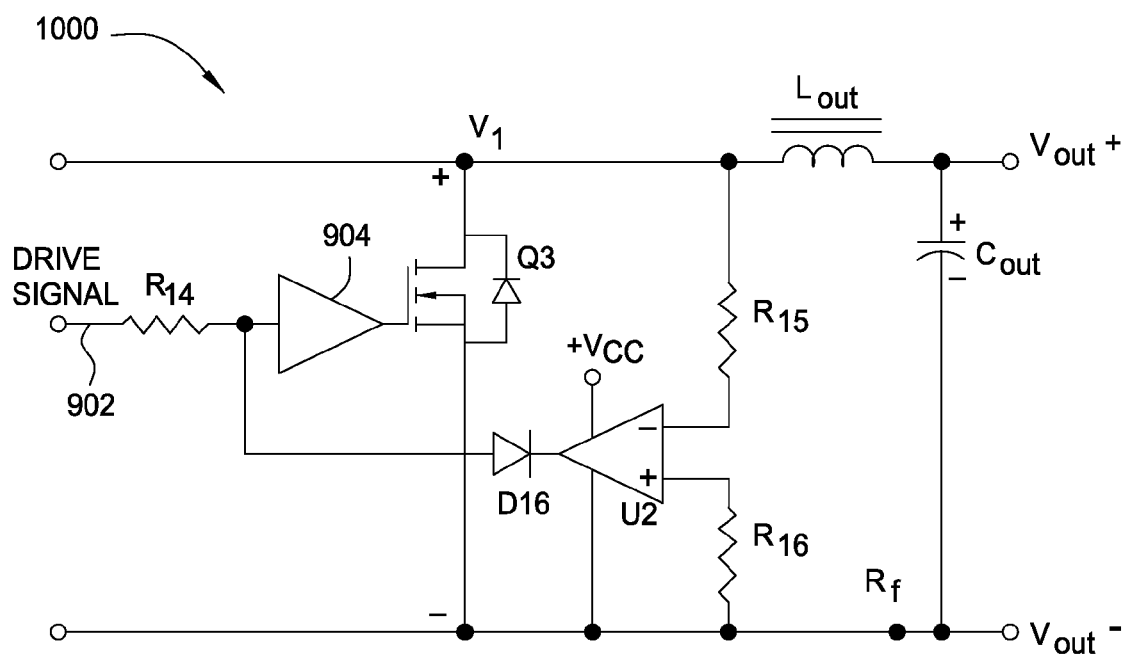
FIG. 10 illustrates a circuit diagram for post regulation of a flyback synchronous rectifier in a forward converter operating in discontinuous mode, in accordance with an embodiment of the present invention.

Referring now to FIG. 10, a circuit diagram 1000 for post regulation of the flyback synchronous rectifier Q3 in a forward converter operating in continuous mode is illustrated. The positive terminal of the comparator U2 may be coupled to the common reference (i.e., electrical ground) of the secondary through a resistor $R_{16}$. The negative terminal of the comparator U2 may be coupled to the drain of the flyback rectifier Q3 through a resistor $R_{15}$.

With this circuit diagram 1000, the comparator U2 will pull the input to the driver 904 to logic low (L) while the series synchronous rectifier Q2 is on, such that the drain-source voltage ($V_{DS}$) across the flyback rectifier Q3 (labeled as $V_1$ in FIG. 10) is positive. The voltage at $V_1$ may be negative with respect to the common reference ($V_{out}^-$) when in normal operation during the off-cycle or with $L_{out}$ in continuous current operation, with the Q3 gate voltage in the high or on-state. However, the voltage at $V_1$ may go positive with respect to the common reference during the on-cycle or when $L_{out}$ is in discontinuous current operation. When $V_1$ is positive, U2 may compare the voltage to the common reference ($V_{out}^-$) and sink the input to the driver 904 to logic low (L) through D16 and $R_{14}$, thereby disabling Q3 during these conditions. This may allow minimum dead-time control without shoot-through current, thereby improving efficiency. Furthermore, this may allow the series synchronous rectifier Q2 to turn off during discontinuous current operation, thereby also improving efficiency.

While the foregoing is directed to embodiments of the present invention, other and further embodiments of the invention may be devised without departing from the basic scope thereof, and the scope thereof is determined by the claims that follow.

The invention claimed is:

1. An apparatus, comprising:
   a transformer having a primary winding and a secondary winding;
   a first switching device coupled to the primary winding for generating changes in voltage across the primary winding such that the primary winding transfers energy to the secondary winding;
   an output filter having an inductor and a capacitor in series;
   a first rectifier coupled between a first end of the secondary winding and the output filter, wherein the first rectifier is a synchronous rectifier;
   a second rectifier in parallel with the output filter and coupled between a second end of the secondary winding and the first rectifier; and
   post regulation logic configured to adjust a parameter of the synchronous rectifier based on an output of the apparatus in an effort to match a target output.

2. The apparatus of claim 1, wherein the parameter is a resistance of the synchronous rectifier or a voltage drop across the synchronous rectifier.

3. The apparatus of claim 2, wherein the post regulation logic is configured to linearly adjust the resistance of the synchronous rectifier.

4. The apparatus of claim 2, wherein the synchronous rectifier is a metal oxide semiconductor field effect transistor (MOSFET) and the post regulation logic is configured to linearly adjust the voltage drop across the synchronous rectifier from a drain-to-source on-resistance ($R_{DS,on}$) multiplied with a current through the synchronous rectifier to a forward voltage drop of a body diode of the MOSFET.

5. The apparatus of claim 2, wherein the post regulation logic is configured to adjust the resistance of the synchronous rectifier by pulse width modulating the resistance between a first resistance and a second resistance.

6. The apparatus of claim 5, wherein the first resistance is a drain-to-source on-resistance ($R_{DS,on}$) of a metal oxide semiconductor field effect transistor (MOSFET) and the second resistance is a drain-to-source off-resistance ($R_{DS,off}$) of the MOSFET.

7. The apparatus of claim 2, wherein the post regulation logic is configured to adjust the voltage drop across the synchronous rectifier by pulse width modulating the voltage drop between a first level and a second level.

8. The apparatus of claim 7, wherein the synchronous rectifier is a metal oxide semiconductor field effect transistor (MOSFET), the first level is a drain-to-source on-resistance ($R_{DS,on}$) of the MOSFET multiplied with a current through the synchronous rectifier, and the second level is a forward voltage drop of a body diode of the MOSFET.

9. The apparatus of claim 1, wherein the output is an output voltage across the capacitor, an output current to a load, or an output power delivered to a load, and the target output is a target output voltage, a target output current, or a target output power.

10. The apparatus of claim 1, wherein the second rectifier is a silicon diode, a Schottky diode, or an n-channel metal oxide semiconductor field effect transistor (MOSFET).

11. An apparatus, comprising:
a transformer having a primary winding and a secondary winding;
a means for switching coupled to the primary winding for generating changes in voltage across the primary winding such that the primary winding transfers energy to the secondary winding;
a means for filtering an output of the apparatus;
a first means for rectifying coupled between a first end of the secondary winding and the means for filtering, wherein the first means for rectifying is a synchronous rectifier;
a second means for rectifying disposed in parallel with the means for filtering and coupled between a second end of the secondary winding and the first means for rectifying; and
means for adjusting a parameter of the synchronous rectifier such that an output of the apparatus is post regulated to meet a target output.

12. The apparatus of claim 11, wherein the parameter is a resistance of the synchronous rectifier or a voltage drop across the synchronous rectifier.

13. The apparatus of claim 12, wherein the means for adjusting is configured to linearly adjust the resistance of the synchronous rectifier.

14. The apparatus of claim 12, wherein the means for adjusting is configured to adjust the resistance of the synchronous rectifier or the voltage drop across the synchronous rectifier by pulse width modulating the resistance or the voltage drop between a first level and a second level.

15. The apparatus of claim 11, wherein the output is an output voltage, an output current, or an output power delivered to a load, and the target output is a target output voltage, a target output current, or a target output power.

16. A method, comprising:
in a first state, closing a switching device coupled to a primary winding of a transformer such that current flows through a first rectifier coupled between an output filter and a first end of a secondary winding of the transformer, through an output inductor of the output filter, and through a load in parallel with an output capacitor of the output filter, wherein the first rectifier is a synchronous rectifier and the output inductor and the output capacitor are in series;
in a second state, opening the switching device such that current flows through the output inductor, the load, and a second rectifier in parallel with the output filter and coupled between the first rectifier and a second end of the secondary winding;
alternating between the first state and the second state; and
adjusting a parameter of the synchronous rectifier such that an output associated with the load is post regulated to meet a target output.

17. The method of claim 16, wherein adjusting the parameter comprises adjusting a resistance of the synchronous rectifier or a voltage drop across the synchronous rectifier.

18. The method of claim 17, wherein adjusting the parameter comprises linearly adjusting the resistance of the synchronous rectifier.

19. The method of claim 17, wherein adjusting the parameter comprises pulse width modulating the resistance of the synchronous rectifier or the voltage drop across the synchronous rectifier between a first level and a second level.

20. The method of claim 16, wherein the output associated with the load is an output voltage, an output current, or an output power delivered to the load, and the target output is a target output voltage, a target output current, or a target output power.

* * * * *